(12) United States Patent
Lee

(10) Patent No.: US 9,197,930 B2
(45) Date of Patent: Nov. 24, 2015

(54) METHODS AND APPARATUS TO DETECT SPILLOVER IN AN AUDIENCE MONITORING SYSTEM

(71) Applicant: Morris Lee, Palm Harbor, FL (US)

(72) Inventor: Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 346 days.

(21) Appl. No.: 13/837,441

(22) Filed: Mar. 15, 2013

(65) Prior Publication Data
US 2014/0282663 A1 Sep. 18, 2014

(51) Int. Cl.
*H04R 3/00* (2006.01)
*H04N 21/442* (2011.01)
*H04N 21/258* (2011.01)
*H04N 21/422* (2011.01)
*H04N 21/439* (2011.01)
*H04N 21/8352* (2011.01)

(52) U.S. Cl.
CPC ... *H04N 21/44213* (2013.01); *H04N 21/25891* (2013.01); *H04N 21/42203* (2013.01); *H04N 21/4394* (2013.01); *H04N 21/44204* (2013.01); *H04N 21/8352* (2013.01); *H04R 3/005* (2013.01)

(58) Field of Classification Search
None
See application file for complete search history.

(56) References Cited

U.S. PATENT DOCUMENTS

| | | | |
|---|---|---|---|
| 6,862,541 B2 | 3/2005 | Mizushima | |
| 7,102,615 B2 | 9/2006 | Marks | |
| 7,555,766 B2 | 6/2009 | Kondo et al. | |
| 7,627,139 B2 | 12/2009 | Marks et al. | |
| 7,739,705 B2 | 6/2010 | Lee et al. | |
| 7,760,248 B2 | 7/2010 | Marks et al. | |
| 2002/0097885 A1 | 7/2002 | Birchfield et al. | |
| 2006/0204012 A1* | 9/2006 | Marks et al. | 381/26 |
| 2008/0112574 A1* | 5/2008 | Brennan et al. | 381/92 |
| 2009/0037575 A1 | 2/2009 | Crystal et al. | |

(Continued)

FOREIGN PATENT DOCUMENTS

| | | | |
|---|---|---|---|
| JP | 2006194700 A | * | 7/2006 |
| KR | 20120131826 | | 12/2012 |

(Continued)

OTHER PUBLICATIONS

International Searching Authority, "International Search Report and Written Opinion", issued in connection with corresponding International Application No. PCT/US2014/028131, dated Jul. 11, 2014 (12 pages).

(Continued)

*Primary Examiner* — Thang Tran
(74) *Attorney, Agent, or Firm* — Hanley, Flight & Zimmerman, LLC

(57) ABSTRACT

Methods and apparatus to detect spillover in an audience monitoring system are disclosed. An example method includes sampling a first audio signal from a first source received by a first microphone; sampling a second audio signal received by a second microphone from the first source, wherein the second microphone is separated from the first microphone by a first distance; calculating an origin direction of the first source based on a time difference between receipt of the first and second audio signals; when the origin direction is within a threshold angle, retaining the media associated with the first source; and when the origin direction exceeds the threshold angle, ignoring the media associated with the first source.

39 Claims, 15 Drawing Sheets

(56) References Cited

U.S. PATENT DOCUMENTS

| | | |
|---|---|---|
| 2009/0055170 A1* | 2/2009 | Nagahama .................. 381/94.1 |
| 2009/0141908 A1* | 6/2009 | Jeong et al. .................... 381/92 |
| 2009/0285409 A1* | 11/2009 | Yoshizawa et al. ............. 381/92 |
| 2009/0296526 A1* | 12/2009 | Amada .......................... 367/99 |
| 2010/0303254 A1* | 12/2010 | Yoshizawa et al. ............. 381/92 |
| 2011/0019835 A1 | 1/2011 | Schmidt et al. |
| 2011/0110531 A1* | 5/2011 | Klefenz et al. ................. 381/92 |
| 2012/0120218 A1 | 5/2012 | Flaks et al. |
| 2012/0124602 A1 | 5/2012 | Tan et al. |
| 2012/0148058 A1 | 6/2012 | Chen |
| 2012/0148067 A1 | 6/2012 | Petersen et al. |
| 2013/0121499 A1* | 5/2013 | Li et al. ....................... 381/71.1 |

FOREIGN PATENT DOCUMENTS

| | | |
|---|---|---|
| KR | 20120131826 | 4/2013 |
| WO | 2006121681 | 11/2006 |
| WO | 2006121681 A1 | 11/2006 |

OTHER PUBLICATIONS

IP Australia, "Examination Report", issued in connection with Australian Patent Application No. 2013204937, dated Feb. 24, 2015 (5 pages).

Patent Cooperation Treaty, "International Preliminary Report on Patentability", mailed on Sep. 24, 2015, in connection with PCT/US2014/028131, (8 pages).

* cited by examiner

| 1302 | 1304 |
|---|---|
| 3 | -12 |
| 2 | -13 |
| 2 | 20 |
| 2 | -6 |
| 2 | -14 |
| 1 | 3 |
| 1 | -11 |
| 1 | -20 |
| 1 | -10 |
| 1 | -19 |
| 1 | 11 |
| 1 | 5 |
| 1 | -15 |
| 1 | -2 |

FIG. 13

METHODS AND APPARATUS TO DETECT SPILLOVER IN AN AUDIENCE MONITORING SYSTEM

FIELD OF THE DISCLOSURE

This disclosure relates generally to media monitoring and, more particularly, to methods and apparatus to detect spillover in an audience monitoring system.

BACKGROUND

Consuming media presentations generally involves listening to audio information and/or viewing video information such as, for example, radio programs, music, television programs, movies, still images, etc. Media-centric companies such as, for example, advertising companies, broadcasting networks, etc., are often interested in the viewing and listening interests of their audience to better market products and/or services.

BRIEF DESCRIPTION OF THE DRAWINGS

FIGS. 8A and 8B are illustrations of example tables used in connection with the example measurement system of FIG. 1.

FIG. 13 illustrates an example table used in connection with the example post-processor of FIGS. 4 and 5.

DETAILED DESCRIPTION

Figure 1:
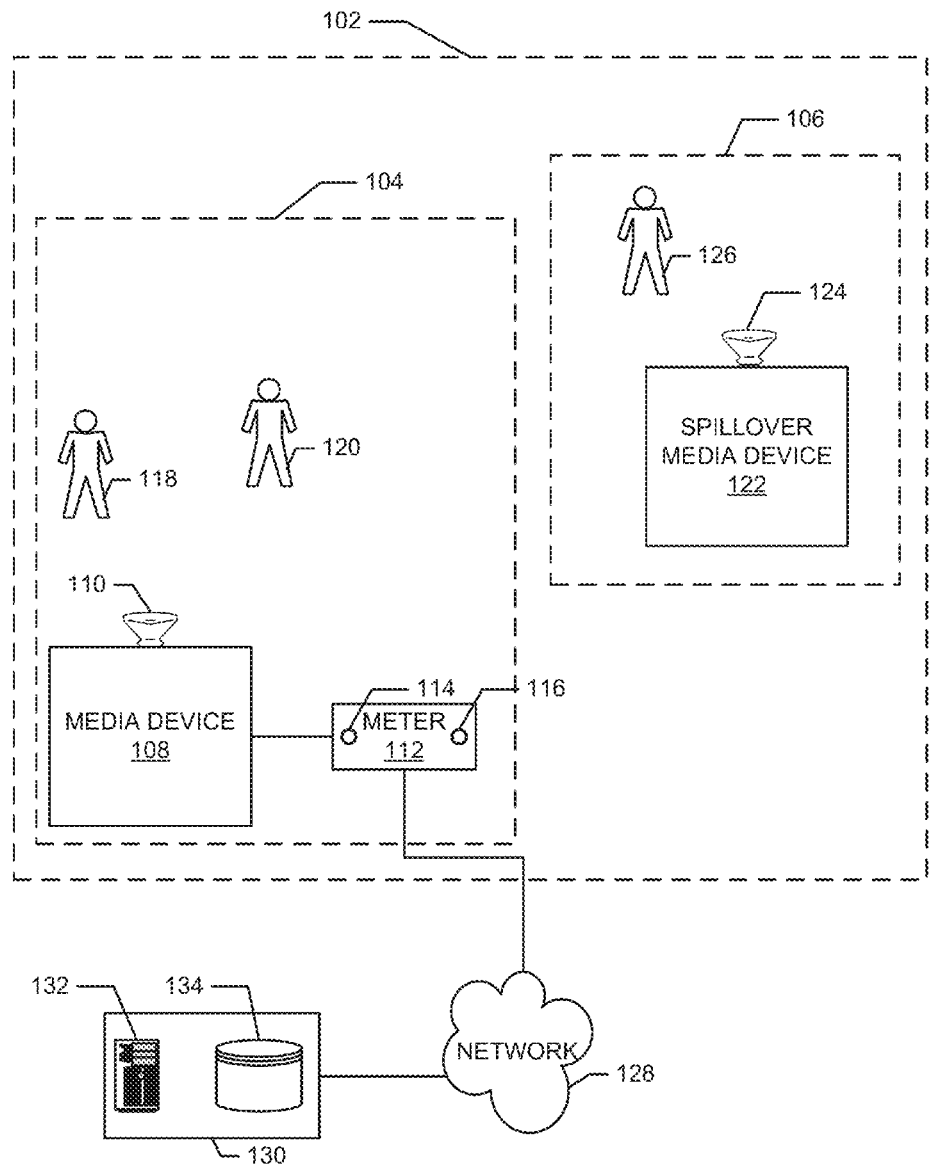
FIG. 1 is a block diagram of an example environment in which an example audience measurement system constructed in accordance with the teachings of this disclosure may be operated to collect audience measurement data.

A technique to measure the exposure and/or number of audience members exposed to media involves awarding media exposure credit to a media presentation when an audience member is exposed to the media presentation. The awarding of media exposure credit may be determined by the media exposed to audience members and detecting the identities and/or number of the persons in the audience. The media usage identifying activities of audience members may also be monitored using a meter placed near a media presentation device such as a television. The meter may be configured to use one or more techniques to monitor media exposure (e.g., viewing and/or listening activities) of one or more audience members. For example, one technique for monitoring media exposure involves detecting and/or collecting information (e.g., codes, signatures, etc.) from audio signals that are emitted or presented by media delivery devices (e.g., televisions, stereos, speakers, computers, etc.).

As audience members are exposed to media presented by a media presentation device, the meter may detect audio associated with the media and generate monitoring data therefrom. In general, monitoring data may include any information that is representative of (or associated with) and/or that may be used to identify a particular media presentation (e.g., content, an advertisement, a song, a television program, a movie, a video game, etc.). For example, the monitoring data may include signatures that are collected or generated by the meter based on the audio codes that are broadcast with (e.g., embedded in) the media, etc.

Unfortunately, the typical household presents unique monitoring challenges to the meter. For example, a typical household includes multiple media delivery devices, each configured to deliver media to specific viewing and/or listening areas located within the home. A meter located in a viewing area (e.g., a room of the household) may be configured to detect any media being delivered in the monitored area by a particular media presentation device and to credit the programming associated with the media as having been exposed to audience members. Thus, the meter operates on the premise that any media detected by the meter is associated with programming originating from the particular media presentation device in the monitored area. However, in some cases, a meter may detect media content that is emitted by one or more different media delivery devices that are not located within the viewing area, thereby causing the detected programming to be improperly credited to the wrong device and/or audience member.

The ability of the meter to detect audio being delivered outside of the monitored area is an effect referred to as "spillover" because the media being delivered outside of the monitored area is described as "spilling over" into the view area occupied by the meter and the particular media presentation device that the meter is intended to measure. Spillover may occur, for example, in a case where a meter associated with and proximate to a television in a bedroom detects audio delivered by a television in an adjacent living room, causing the meter to improperly credit the media as having originated from the television in the bedroom and being exposed to persons in the bedroom.

The meter may also be used to determine whether the media presentation device to be monitored is turned on. This determination may be made by monitoring the sound level detected by the meter and determining that the media presentation device is turned on if the detected sound level is above a threshold (e.g., a threshold audio energy value in dB). However, if the ambient room noise (e.g., from persons talking near the meter) or sound from another media presentation device causes the meter to detect sound above the threshold, the meter may incorrectly determine that the media presentation device to be monitored is powered on even though it is actually turned off.

Example methods, apparatus, systems and/or articles of manufacture disclosed herein include a meter to receive audio from a media presentation device, and to monitor audio codes embedded in the audio received from the media presentation device via two microphones on either side of the meter, separated by a distance. In some examples disclosed herein, the meter determines the direction from which audio is received by measuring the time difference between when audio is received by each of the two microphones. In other examples disclosed herein, the meter determines whether received audio is from the media presentation device to be monitored based on the determined direction of the sound.

FIG. 1 is a block diagram of an example environment in which an example audience measurement system constructed in accordance with the teachings of this disclosure may operate to collect audience measurement data. For purposes of clarity and efficiency, the example system and corresponding methods, systems, apparatus and/or articles of manufacture are described herein with respect to an example area/environment of use 102. In the illustrated example of FIG. 1, the area 102 is a household. However, in other examples, the area 102 may be a store (e.g., a retail establishment), a shopping mall, an amusement park, and/or other areas. The example environment 102 includes rooms 104 and 106, a media device 108, one or more media device speakers 110, a spillover media device 122, one or more spillover media device speakers 124 and one or more audience members 118, 120, 126. The environment of the illustrated example is monitored by 112, 114, and 116. Data collected in the environment is delivered via a network 128 to a data collection facility 130 having a server 132 and a database 134.

The rooms 104 and 106 of the illustrated example are rooms within the household 102 (e.g., a bedroom, a kitchen, a living room, etc.).

The example media device 108 delivers media (e.g., content and/or advertisements), and the one or more speakers 110 emit audio signals that propagate throughout the room 104. Audience members 118, 120 in the room 104 are exposed to the media delivered by the media device 108. The media device 108 may be represented by a television, a radio, a computer, etc.

In the illustrated example of FIG. 1, the meter 112 monitors the media delivered by the media device 108 by detecting audio signals from the media device speakers 110. The example meter 112 detects one or more audio codes embedded in a detected audio signal. The audio codes identify a particular media presentation (e.g., a television program) being delivered by the media device 108. The identification can be by identifying the media presentation by name, or by identifying a station and/or signature and a timestamp that enable looking up the program in a table. The example meter 112 of the illustrated example is placed in the room 104 near the media device 108 and audio signals emitted from the one or more speakers 110 are detected by the first microphone 114 and the second microphone 116. In the illustrated example of FIG. 1, the first microphone 114 and the second microphone 116 are separated by a distance (e.g., based on the size of the housing of the meter 112 (e.g., three inches)). Because the example first microphone 114 is spatially closer to the speakers 110 than the example second microphone 116, sound detected by the example meter 112 will arrive at the first microphone before arriving at the second microphone 116. The time difference between when the two microphones detect audio can be used to determine an origin direction (i.e., the direction from which the sound originated).

In the illustrated example of FIG. 1, audio signals emitted by the media device speakers 110, the spillover media device speakers 124 and/or other sources propagate throughout the room 104 at the speed of sound. Generally speaking, the speed of sound is dependent upon atmospheric conditions including air temperature and humidity and will be assumed herein to propagate at 13,041.6 inches per second (331.25 meters per second). However, one or more alternate propagation speeds may result for one or more alternate environmental conditions. In the event the example media device speaker 110 emits a sound at time zero ($t_0$), the emitted sound will reach the first microphone 114 at a first time ($t_1$) and the emitted sound will reach the second microphone 116 at a second time ($t_2$). The example meter 112 may calculate the difference between the time an audio signal reaches the first microphone 114 ($t_1$) and the time the audio signal reaches the second microphone 116 ($t_2$). Additionally, because the propagation speed of sound is known and the distance between the first microphone 114 and the second microphone 116 is known, the angle between the example meter 112 and the source of the audio signal can be determined by the example meter 112.

In the illustrated example of FIG. 1, the spillover media device 122 is a media delivery device (e.g., a television, a radio, etc.) located in the room 106. The example spillover media device 122 delivers media audio via one or more spillover media device speakers 124 that is intended to deliver media to audience member 126 within the room 106. However, the audio emitted by the example spillover media device speakers 124 may spillover into the other room 104 and be detected by the meter 112. This may cause the meter 112 to incorrectly record the media delivered by the spillover media device 122 as being delivered by the media device 108. This may cause errors in the reporting of the media presented by the media devices 108, 122 in the household 102.

The example data collection facility 130 of the illustrated example of FIG. 1 receives data collected by the example meter 112 (e.g., detected audio codes, detected origin directions of received audio). In the illustrated example of FIG. 1, the data collection facility 130 contains the server 132 and the database 134. The example database 134 stores data received by the data collection facility 130 from the meter 112, and may be implemented using any suitable memory and/or data storage apparatus and/or techniques. The example server 132 analyzes the information stored in the database 134 to, for example, determine one or more media usage activities of the example household 102.

In the illustrated example of FIG. 1, the meter 112 is able to communicate with the data collection facility 130 and vice versa via the network 128. The example network 128 of FIG. 1 allows a connection to be selectively established and/or torn down between the example meter 112 and the example data collection facility 130. The example network 128 may be implemented using any type of public or private network such as, for example, the Internet, a telephone network, a local area network (LAN), a cable network, and/or a wireless network. To enable communication via the example network 128, the example meter 112 and the example data collection facility 130 of FIG. 1 of the illustrated example include a communication interface that enables connection to an Ethernet, a digital subscriber line (DSL), a telephone line, a coaxial cable and/or a wireless connection, etc.

Figure 2:
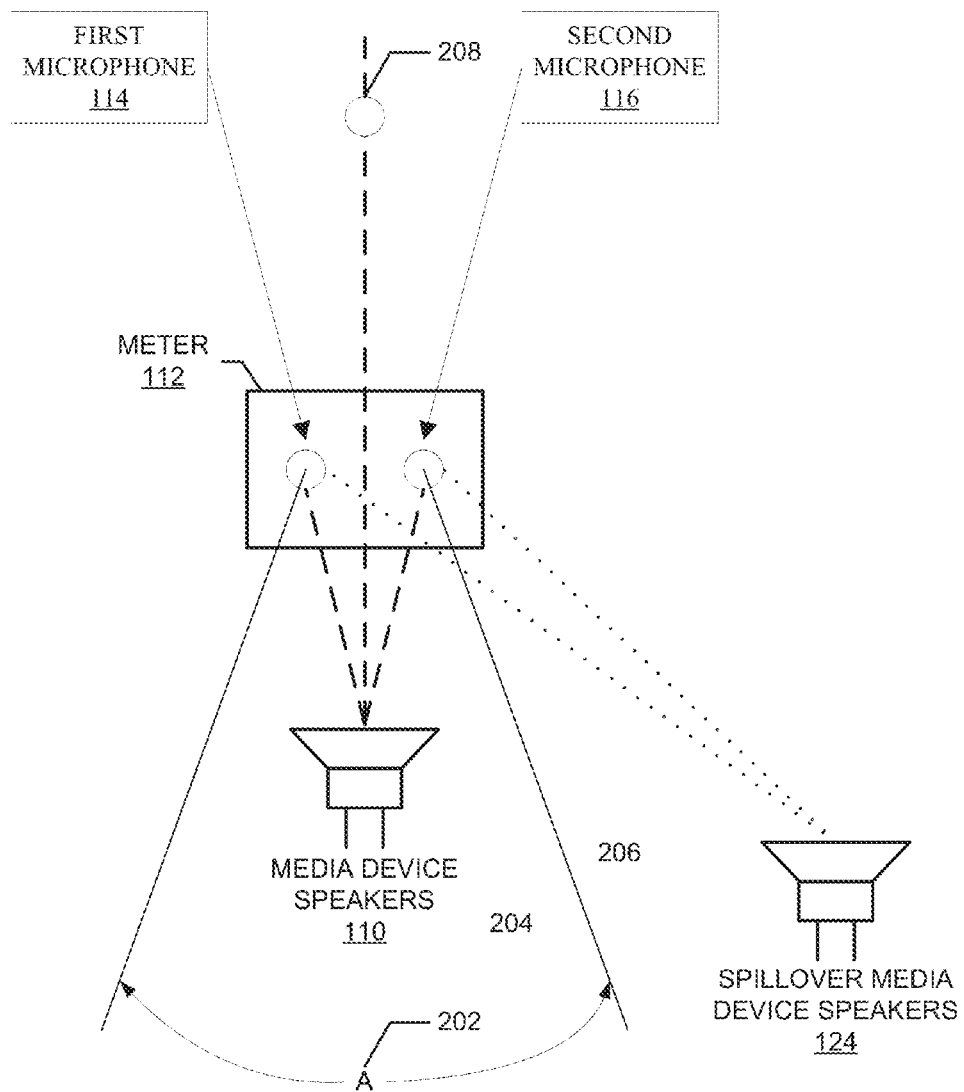
FIG. 2 is an enlarged illustration of a portion of the example measurement system of FIG. 1.

FIG. 2 illustrates an example implementation to detect spillover in an environment having one or more particular locations of the media device speakers 110 and the spillover media device speakers 124. Audio signals will be received by the first microphone 114 either before or after the same audio signals are received by the second microphone 116. The time delay between when audio is received by the two microphones 114, 116 will depend on the distance between the two microphones 114, 116 and the angle from which the sound is received. Because the distance between the microphones 114, 116 is fixed in the illustrated example of FIG. 2, the time delay between when an audio signal is received by the two microphones 114, 116 depends on the angle of the source of the audio signal.

In the illustrated example of FIG. 2, the media device speakers 110 and the spillover media device speakers 124 are placed at different angles from the meter 112. Sound from the example media device speakers 110 will be received by the meter 112 from within an angle (A) 202 indicating the sound source is within area 204. Additionally, sound from the example spillover media device speakers 124 will be received by the example meter 112 from outside the angle (A) 202, which is indicative of a sound source within area 206. By detecting the origin direction of the sound using the techniques described herein, the meter 112 can accept audio codes received from within area 204 and ignore audio codes received from area 206. This will allow the meter 112 to distinguish local media (e.g., audio emitted by the media device 108) from spillover media (e.g., audio emitted by the spillover media device 122) and to ignore audio from the spillover media device speakers 124 and only accept audio codes received from the media device speakers 110.

In the illustrated example of FIG. 2, the angle of received audio is determined by measuring the time difference between when audio is received by the first microphone 114 and the second microphone 116. Audio received from the example media device speakers 110 of FIG. 1 will be received by the example first microphone 114 and the example second microphone 116 at about the same time because the distance from the media device speakers 110 to the first microphone 114 is the same as the distance from the media device speakers 110 to the second microphone 116. However, the distance from the first microphone 114 to point 208 in the example of FIG. 2 is the same as the distance from the second microphone 116 to point 208. Therefore, audio received by the meter 112 from a sound source at point 208 will be received by the first microphone 114 and the second microphone 116 at the same time. As such, when audio is received by the first microphone 114 and the second microphone 116 at the same time, the meter 112 determines that the audio came from either the direction of the media device speakers 110 in the example of FIG. 2 or from the direction of point 208. Yet, the meter 112 is unable to determine which of these two directions the audio came from. This is called front-back indeterminacy and is caused by the fact that only two microphones are used by the meter 112. As described in further detail below, example methods, systems, apparatus and/or articles of manufacture disclosed herein facilitate resolution of front-back indeterminacy via scheduled, periodic and/or aperiodic rotation of the first and second microphones 114, 116.

Figure 3:
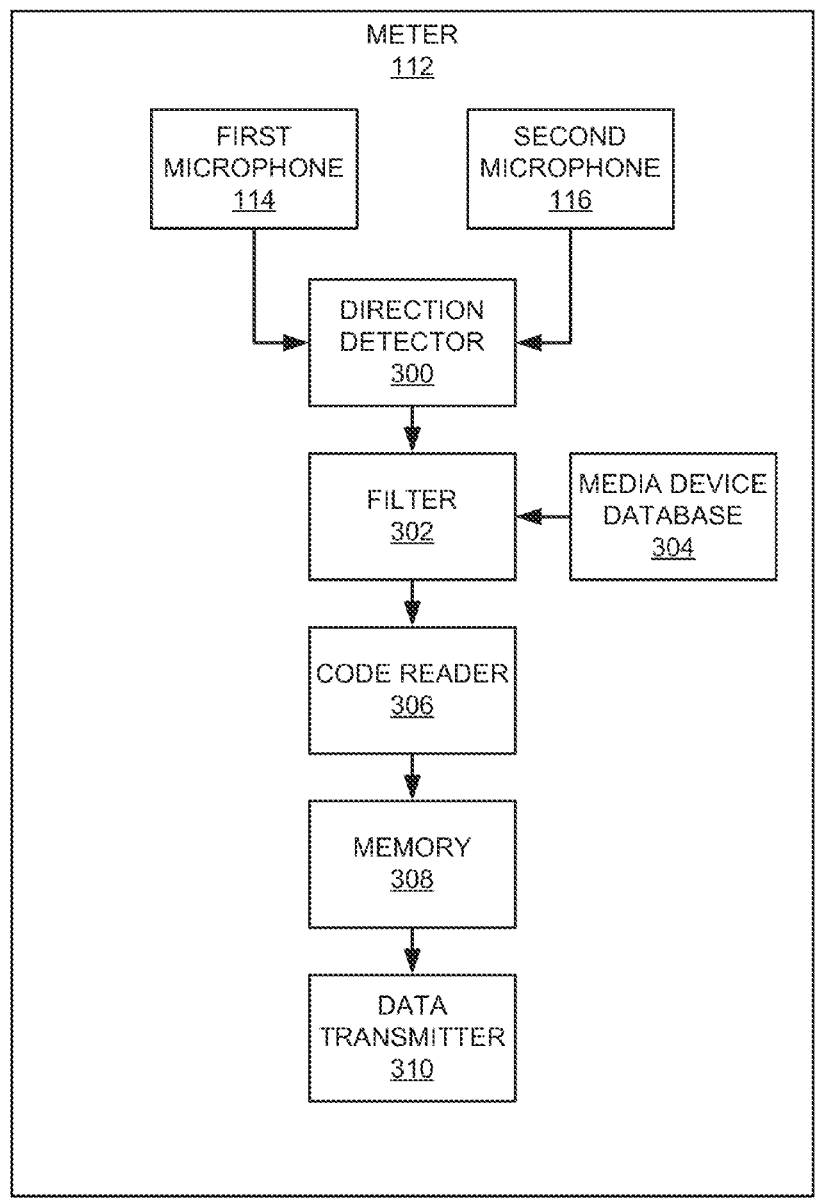
FIG. 3 is a block diagram of an example implementation of the meter of FIG. 1.

FIG. 3 is a block diagram of an implementation of the example meter 112 of FIG. 1. In the illustrated example of FIG. 3, the meter 112 includes the first microphone 114, the second microphone 116, a direction detector 300, a filter 302, a media device database 304, a code reader 306, a memory 308, and a data transmitter 310.

The first microphone 114 and the second microphone 116 of the illustrated example of FIG. 3 are located on different sides of the housing of the meter 112 and are separated by a distance (e.g., three inches). In some examples, the meter 112 rotates 90 degrees (by a motor or other device) to change the orientation of first microphone 114 and the second microphone 116. In other examples, the meter 112 remains stationary while the first and second microphones 114, 116 rotate within an enclosure of the meter.

Figure 4:
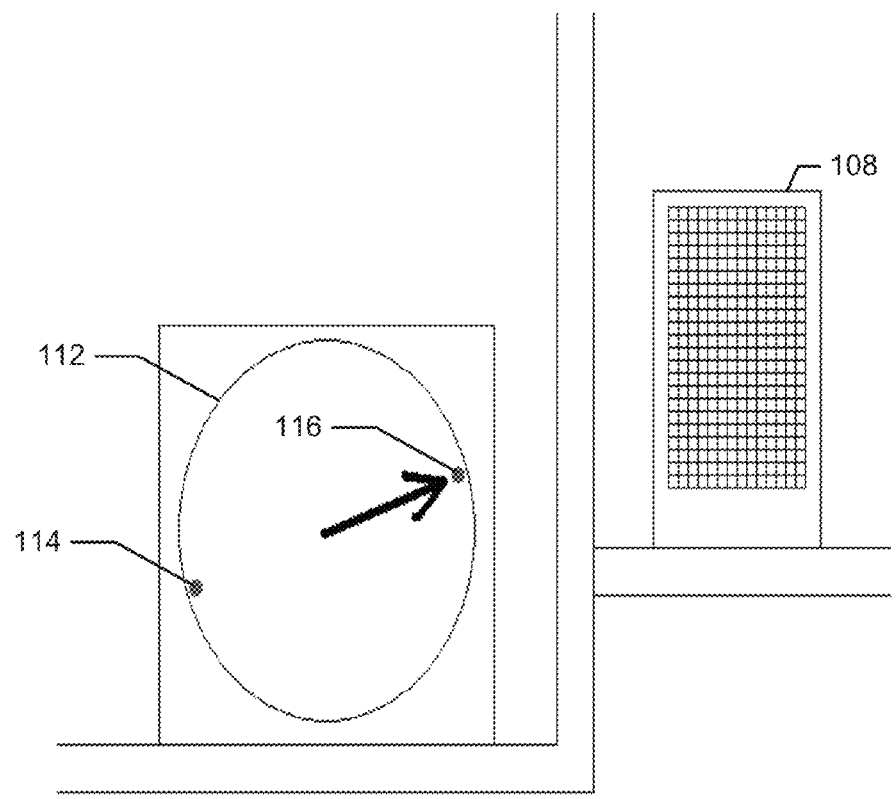
FIG. 4 is an enlarged illustration of a portion of the example measurement system of FIG. 1.

FIG. 4 illustrates one example implementation of the meter 112 in which the meter 112 is able to rotate. In the example of FIG. 4, the meter 112 is rotated such that the first and second microphones 114, 116 are oriented such that they 'point' towards the media device 108 as illustrated in FIG. 4. This may increase the accuracy of the measurements taken by the example meter 112. In other examples, the meter 112 is rotated to deal with indeterminacy, as described below.

As described above, front-back indeterminacy may occur when the first and second microphones 114, 116 are oriented in a line from left to right with respect to each other and the example meter 112 is unable to determine whether a sound source is in front of or in back of the line occupied by the first and second microphones 114, 116 (e.g., as shown in FIG. 2 with respect to the first and second microphones 114, 116 and the sound sources 110 and 208). Side-to-side (e.g., left-right) indeterminacy may occur when the first and second microphones 114, 116 are oriented in a line from front to back with respect to each other and the example meter 112 is unable to determine whether a sound source is to the left or to the right of the line occupied by the first and second microphones 114, 116. As such, when the example first and second microphones 114, 116 are rotated by, for example, 90 degrees on a periodic, scheduled, aperiodic and/or manual basis, one or more issues of indeterminacy may be overcome.

For example, if the meter 112 is oriented as shown in FIG. 2, this creates front-back indeterminacy as explained in connection with FIG. 2. However, if the example first and second microphones 114, 116 or the example meter 112 is rotated by 90 degrees, then the change in orientation of the first and second microphones 114, 116 will create left-right indeterminacy. Measuring audio direction using two different orientations eliminates any indeterminacy.

The direction detector 300 of the illustrated example of FIG. 3 detects the origin direction of an audio signal received by the meter 112. An example implementation of the direction detector 300 is discussed further in connection with FIG. 5. The example filter 302 of FIG. 3 filters out audio signals received from one or more origin directions (e.g., the filter 302 accepts audio signals received from within angle (A) 202 and ignores audio signals received from outside of angle (A) 202 as shown in FIG. 2). The example filter 302 of FIG. 3 determines what audio signal origin directions to filter by accessing the example media device database 304, which stores information about the location of the meter 112 in the household 102, the orientation of the meter 112 and the location of media device 108 in the household 102. The example filter 302 uses the information stored in the media device database 304 to determine the direction from the meter 112 that the media device 108 is located and what angles of sound origin direction should be filtered out.

The example code reader 306 of FIG. 3 detects audio codes embedded in received audio signals that are not filtered out by the filter 302. One or more detected audio codes may be stored in the example memory 308 to facilitate periodic, scheduled, aperiodic and/or manual transfer to the example data collection facility 130 via the example data transmitter 310. The embedded audio codes may identify a television program or television station being presented by the example media device 108.

In some examples, a signature generator is used in place of or in addition to the code reader 306 to generate media signatures. Media signatures are a representation of some characteristic of the media signal (e.g., a characteristic of the frequency spectrum of the signal). Signatures can be thought of as fingerprints. They are typically not dependent upon insertion of identification codes in the media, but instead preferably reflect an inherent characteristic of the media and/ or the media signal. Systems to utilize codes and/or signatures for audience measurement are long known. See, for example, Thomas, U.S. Pat. No. 5,481,294, which is hereby incorporated by reference in its entirety.

Figure 5:
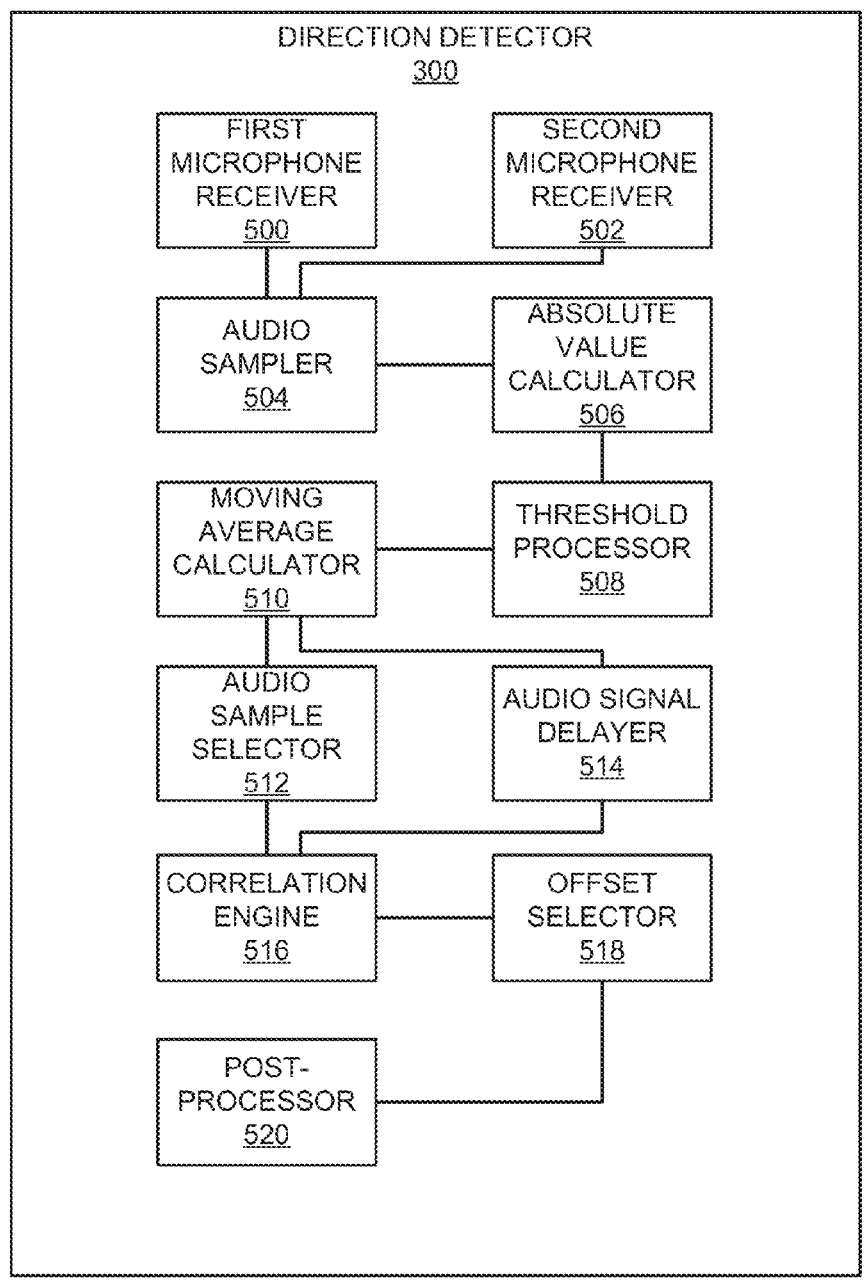
FIG. 5 is a block diagram of an example implementation of the direction detector of FIG. 2.

FIG. 5 is a block diagram of an implementation of the example direction detector 300 of FIG. 3. The example direction detector 300 includes a first microphone receiver 500, a second microphone receiver 502, an audio sampler 504, an absolute value calculator 506, a threshold processor 508, a moving average calculator 510, an audio sample selector 512, an audio signal delayer 514, a correlation engine 516, an offset selector 518, and a post-processor 520.

In operation, the example direction detector 300 determines the origin direction of an audio source with respect to the example meter 112 for an audio signal received by the meter 112 from the audio source. The example direction detector 300 of FIGS. 3 and 4 determines an audio signal origin direction by determining the time difference between when the audio signal is received by the example first microphone 114 and the same audio signal is received by the example second microphone 116.

Figure 7:
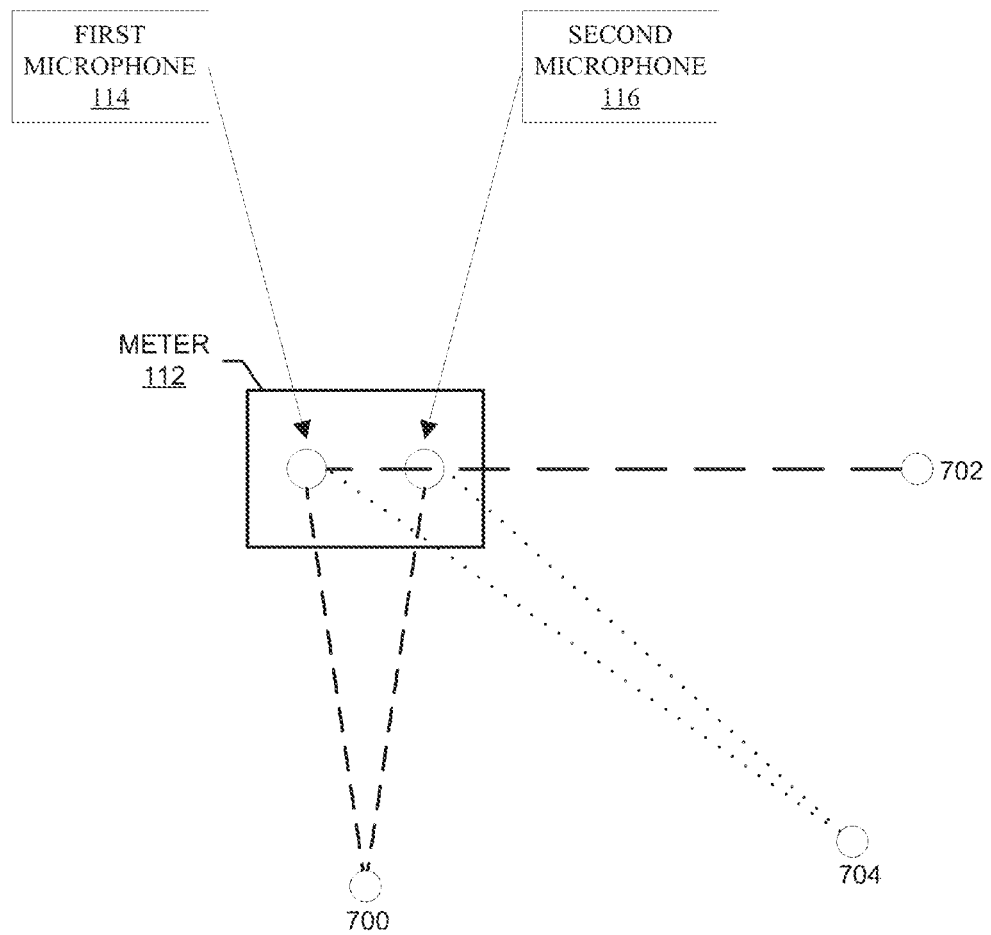
FIG. 7 is an illustration of the example meter of FIG. 1 in operation.

For example, FIG. 7 illustrates sounds propagating from a first source 700, a second source 702, and a third source 704 to the example meter 112. In the illustrated example of FIG. 7, the first source 700 is equidistant from the first microphone 114 and the second microphone 116. Therefore, sound emanating from the example first source 700 arrives at the example first microphone 114 and the example second microphone 116 at the same time. On the other hand, the example second source 702 is further from the example first microphone 114 than from the example second microphone 116. Therefore, sound emanating from the second source 702 arrives at the example second microphone 116 before arriving at the example first microphone 114. In the example of FIG. 7, the third source 704 is also further away from the first microphone 114 than the second microphone 116, but the difference in distance is not as great as with the second source 702. Therefore, sound emanating from the third source 704 arrives at the second microphone 116 before arriving at the first microphone 114, but this time difference is not as great as sound from the second source 702.

In the illustrated example of FIG. 7, the speed of sound is assumed to be 13,041.6 inches/second, the first microphone 114 and the second microphone 116 are separated by three inches and audio received by the meter 112 is sampled at 48,000 Hertz (i.e., 48,000 samples per second). Therefore, in the illustrated example of FIG. 7, sound emanating from the second source 702 will have to travel three inches further to reach the first microphone 114 than to reach the second microphone 116. The amount of time it takes sound to travel three inches can be calculated by dividing three inches by 13,041.6 inches/second which equals approximately 0.00023 seconds. Because the example meter 112 samples received audio 48,000 per second, multiplying 0.00023 seconds times 48,000 samples per second results in approximately 11 samples that will be received by the second microphone 116 from the second source 702 before the first sample from the second source 702 is received by the first microphone 114. Therefore, the audio signal received by the second microphone 116 from the second source 702 delayed by eleven samples should match the audio signal received by the first microphone 114 from the second source 702.

A similar delay in audio samples between an audio signal received by the example first microphone 114 and the example second microphone 116 can be determined for any other source location by determining the distance between respective source(s) and the first and second microphones 114, 116 and performing similar calculations as disclosed above.

Figure 8A:
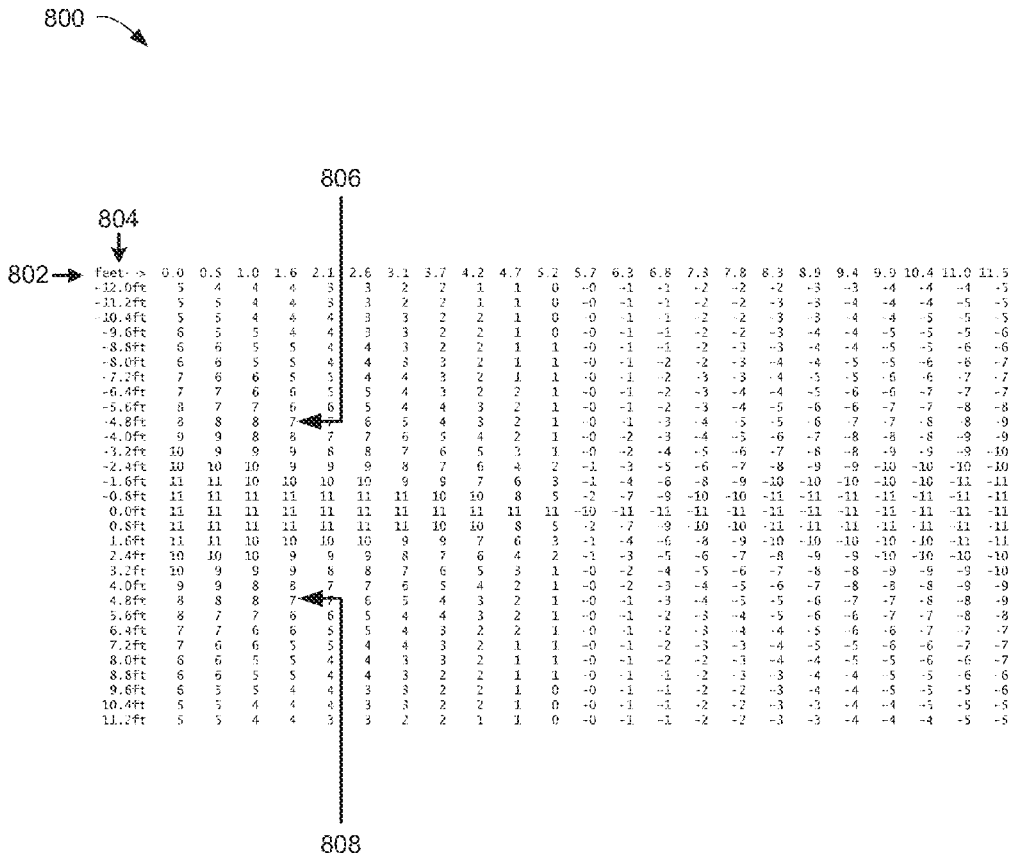

FIG. 8A is a chart 800 illustrating example delays in numbers of samples between when an audio signal is received by the example first microphone 114 and when the audio signal is received by the example second microphone 116 for one or more placements of the audio source within a room. In the example chart 800 of FIG. 8A, the room is 12 feet long by 24 feet wide and the example meter 112 is placed in the center of the room. Row 802 of the example chart 800 lists how far an audio source is from the left of the room, and the example meter 112 is placed between 5.2 and 5.7 feet from the left of the room. Column 804 of the example chart 800 lists how far an audio source is in front or back of the center of the room, in which positive numbers represent audio sources in front of the center of the room and negative numbers represent audio sources behind the center of the room.

The values of the example chart 800 of FIG. 8A list the number of samples of an audio signal from an audio source would reach the first microphone 114 before reaching the audio signal reaches second microphone 116. Positive numbers indicate that the audio signal would reach the first microphone 114 before reaching the second microphone 116. Negative numbers indicate that the audio signal would reach the second microphone 116 before reaching the first microphone 114. For example, an audio source 1.6 feet from the left of the room and 4.8 feet in front or behind the center of the room would send seven samples to the first microphone 114 before the first sample of the audio signal reached the second microphone 116 (as shown by points 806 and 808 of FIG. 8). Because the first microphone 114 and the second microphone 116 are oriented left to right in the example of FIG. 8, the same result of 7 samples is obtained whether the audio source is 4.8 feet in front or 4.8 feet behind the example meter 112. This illustrates an example of front-back indeterminacy.

Figure 8B:
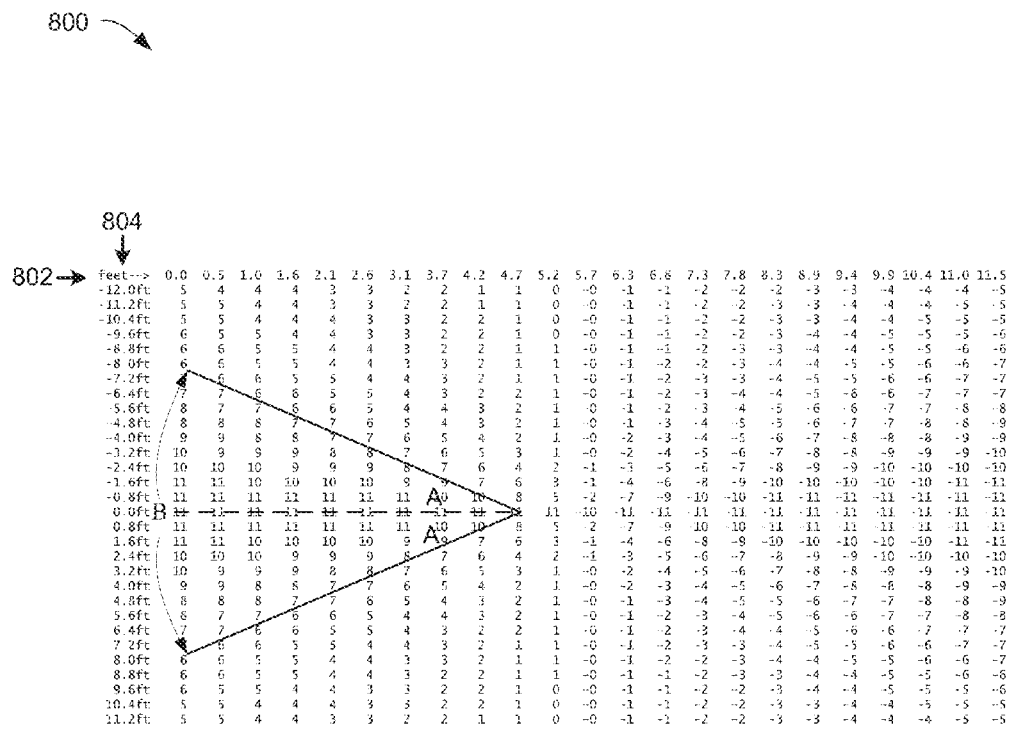

The direction detector 300 may generate a chart such as chart 800 to determine the angle of a sound source, as shown in FIG. 8B. In the illustrated example of FIG. 8B, if the direction detector 300 detects that an audio signal received by the second microphone 116 was delayed by seven samples from the audio signal received by the first microphone 114, then the direction detector 300 determines that the audio was either received from an angle (A) or an angle (−A) because audio received from any other angle would have resulted in a different sample delay between the audio received by the first and second microphones 114, 116. Furthermore, if the example direction detector 300 detects that an audio signal received by the second microphone 116 was delayed by seven samples or more from the audio signal received by the first microphone 114, then the direction detector 300 determines that the audio signal was received from within an angle (B) because an audio source received from outside of angle (B) would have a sample delay between the audio received by the first and second microphones 114, 116 of less than seven. The example filter 302 may filter out audio received from an angle outside of angle (B) if, for example, the example media device 108 is within angle (B).

Returning to FIG. 5, the first microphone receiver 500 of the illustrated example receives the audio signals detected by the first microphone 114. The second microphone receiver 502 of FIG. 5 receives the audio signals detected by the second microphone 116. The audio signals received by the first microphone receiver 500 and the second microphone receiver 502 are analog audio signals emitted by the media device speakers 110, the spillover media device speakers 124, the audience members 118, 120, 126 or other audio sources in the household 102.

The audio sampler 504 of the illustrated example converts the analog audio signals received by the first microphone receiver 500 and the second microphone receiver 502 into digital audio signals by sampling the received analog audio signals. In the illustrated example, the sampling rate is 48,000 Hertz (i.e., the analog audio signals are sampled 48,000 times per second). In other examples, other sampling rates may be used. The absolute value calculator 506 of the illustrated example calculates an absolute value of an audio signal.

The threshold processor 508 of the illustrated example determines a decimation threshold value for an audio signal and eliminates audio samples with an audio intensity value below the determined decimation threshold. In the illustrated example of FIG. 5, the threshold processor 508 determines one decimation threshold for the audio signals received by the first microphone receiver 500 and another decimation threshold for the audio signals received by the second microphone receiver 502. Alternatively, the threshold processor 508 may determine the same decimation threshold for the audio received by the first microphone receiver 500 and the second microphone receiver 502. In the illustrated example, the threshold processor 508 determines a decimation threshold value for an audio signal such that 98.5% of the samples of the audio signal are below the decimation threshold and 1.5% of the samples of the audio signal are above the decimation threshold. In other examples, other threshold levels may be determined.

The moving average calculator 510 of the illustrated example calculates a moving average of an audio signal. A moving average may be implemented by the example moving average calculator 510 as a low-pass filter by taking the average of an audio sample and one or more neighboring audio samples for every sample in an audio signal. In the illustrated example of FIG. 5, the moving average calculator 510 takes a moving average of two samples. In other examples, the moving average calculator 510 may take a moving average of a different number of samples.

The audio sample selector 512 of the illustrated example selects a number of samples (e.g., 1,000 samples) equally spaced over an audio signal (e.g., a 36 second audio segment received by the example first microphone receiver 500). In some examples, the audio sample selector 512 selects a number of samples that are un-equally spaced over an audio signal (e.g., more samples may be selected from certain portions of the audio signal and less samples selected from other portions of the audio signal). In the illustrated example of FIG. 5, the audio sample selector 512 selects 1,000 samples. In other examples, another number of samples may be selected. The example audio sample selector 512 selects two or more sets of 1,000 samples, in which each set of samples is offset by a different length of time. For example, the audio sample selector 512 first selects 1,000 samples from an audio signal, in which the selected audio samples are equally spaced between the first sample of the audio signal and another later sample in the audio signal (e.g., 36 seconds into the audio signal). The example audio sample selector 512 may later select 1,000 samples from the audio signal, in which the selected audio samples are equally spaced between a sample after the first sample of the audio signal (e.g., a sample 0.5001 seconds into the audio signal) and another later sample (e.g., a sample 36.5 seconds into the audio signal). The example audio sample selector 512 may make additional selections of 1,000 samples, wherein each subsequent selection of 1,000 samples is offset by an additional time (e.g., 0.5001 seconds) from the previously selected 1,000 samples.

The audio signal delayer 514 of the illustrated example selects audio samples from an audio signal delayed by a number of samples from another audio signal. For example, if the example audio sample selector 512 selects 1,000 samples from the audio signal received by the first microphone receiver 500, in which the 1,000 samples are received at 1,000 different points in time, the example audio signal delayer 514 may select 1,000 samples from the audio signal received by the second microphone 502 at the same 1,000 points in time. The example audio signal delayer 514 may later select 1,000 samples from the audio signal received by the second microphone 502 one sample after each of the 1,000 samples previously selected by the audio signal delayer 514 (i.e., the audio signal delayed by 1 sample). The example audio signal delayer 514 may later select 1,000 samples from the audio signal received by the second microphone 502 one sample before each of the 1,000 samples initially selected by the audio signal delayer 514 (i.e., the audio signal delayed by −1 sample).

The correlation engine 516 of the illustrated example determines a correlation between two audio signals. In the illustrated example, the correlation engine 516 determines a correlation between 1,000 samples from the audio signal received by the first microphone receiver 500 and 1,000 samples from the audio signal received by the second microphone receiver 502 offset by some number of samples. In the illustrated example, the correlation engine 516 determines multiple correlations between the samples selected by the audio sample selector 512 from the first microphone receiver 500 and samples selected by the audio signal delayer 514 from the second microphone receiver 502, wherein the audio signal delayer 514 delays the audio signal received by the second microphone receiver 502 before each correlation is calculated. The example correlation engine 516 may employ any type of statistical and/or correlation algorithm on received audio signals such as, but not limited to a normalized correlation, Pearson correlation coefficients and/or rank correlation coefficients.

The offset selector 518 of the illustrated example determines which of the correlations determined by the correlation engine 516 between a set of samples selected by the audio sample selector 512 and the sets of samples selected by the audio signal delayer 514 has the highest correlation value. That is, the offset selector 518 of the illustrated example determines the sample offset of the audio signal received by the example second microphone receiver 502 that most closely correlates to the audio signal received by the example first microphone receiver 500.

The post-processor 520 of the illustrated example processes the outputs of the offset selector 518. An example implementation of the post-processor 520 is discussed further in connection with FIG. 6.

Figure 6:
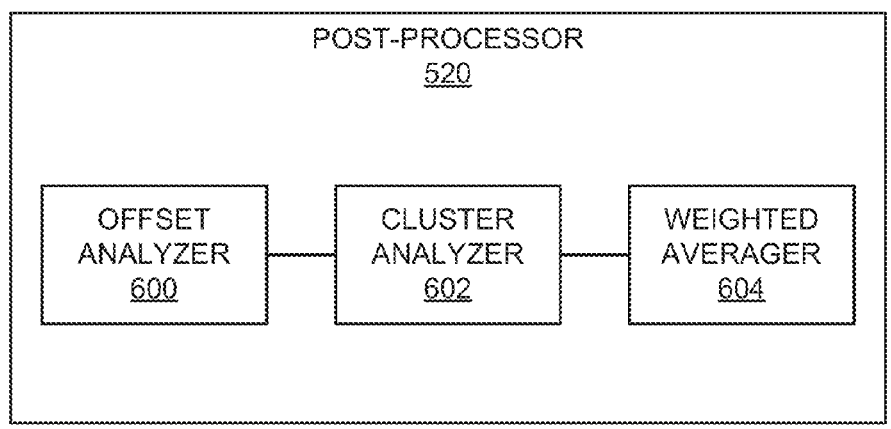
FIG. 6 is a block diagram of an example implementation of the post-processor of FIG. 5.

FIG. 6 is a block diagram of an implementation of the example post-processor 520 of FIG. 5. The example post-processor 520 includes an offset analyzer 600, a cluster analyzer 602, and a weighted average 604.

The example offset analyzer 600 of the illustrated example counts the number of times that each offset in samples was determined by the offset selector 518 to determine an offset count for each determined offset (e.g., an offset of 7 samples was determined three times, an offset of 3 samples was determined two times, an offset of −4 samples was determined once, etc.). One or more of these offset counts is then sent to the example cluster analyzer 602. In the illustrated example, the counts of the three most common offsets (i.e., the three offsets that were determined most frequently by the example offset selector 518) are sent to the cluster analyzer 602. In other examples, a different number of counts may be sent to the cluster analyzer 602.

The cluster analyzer 602 of the illustrated example determines whether each of the offset counts received from the offset analyzer 600 should be accepted into a cluster. The offset counts sent from the example offset analyzer 600 are received by the example cluster analyzer 602 one at a time. When the first offset count is received by the example cluster analyzer 602, the offset count is accepted into the cluster. When subsequent offset counts are received by the example cluster analyzer 602, a received offset count is accepted into the cluster if and only if the difference between the offset corresponding to the offset count and the offset corresponding to at least one of the other offset counts already in the cluster is less than or equal to two. After the example cluster analyzer 602 analyzes each of the offset counts sent from the example offset analyzer 600, the offset counts accepted into the cluster and the corresponding offsets are sent to the example weighted averager 604.

The weighted averager 604 of the illustrated example computes a weighted average of the offsets accepted into the cluster by the cluster analyzer 602, in which each offset is weighted by the corresponding offset count. The weighted average output by the example weighted averager 604 can be used to determine an angle of an audio source by, for example, using the example table 800 disclosed in connection with FIG. 8A.

While an example manner of implementing the audience measurement system of FIG. 1 is illustrated in FIGS. 1-7, one or more of the elements, processes and/or devices illustrated in FIGS. 1-7 may be combined, divided, re-arranged, omitted, eliminated and/or implemented in any other way. Further, the example meter 112, the example first microphone 114, the example second microphone 116, the example data collection facility 130, the example server 132, the example database 134, the example direction detector 300, the example filter 302, the example media device database 304, the example code reader 306, the example memory 308, the example data transmitter 310, the example first microphone receiver 500, the example second microphone receiver 502, the example audio sampler 504, the example absolute value calculator 506, the example threshold processor 508, the example moving average calculator 510, the example audio sample selector 512, the example audio signal delayer 514, the example correlation engine 516, the example offset selector 518, the example post-processor 520, the example offset analyzer 600, the example cluster analyzer 602, and/or the example weighted averager 604 may be implemented by hardware, software, firmware and/or any combination of hardware, software and/or firmware. Thus, for example, any of the example meter 112, the example first microphone 114, the example second microphone 116, the example data collection facility 130, the example server 132, the example database 134, the example direction detector 300, the example filter 302, the example media device database 304, the example code reader 306, the example memory 308, the example data transmitter 310, the example first microphone receiver 500, the example second microphone receiver 502, the example audio sampler 504, the example absolute value calculator 506, the example threshold processor 508, the example moving average calculator 510, the example audio sample selector 512, the example audio signal delayer 514, the example correlation engine 516, the example offset selector 518, the example post-processor 520, the example offset analyzer 600, the example cluster analyzer 602, and/or the example weighted averager 604, and/or more generally the example audience measurement system could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example meter 112, the example first microphone 114, the example second microphone 116, the example data collection facility 130, the example server 132, the example database 134, the example direction detector 300, the example filter 302, the example media device database 304, the example code reader 306, the example memory 308, the example data transmitter 310, the example first microphone receiver 500, the example second microphone receiver 502, the example audio sampler 504, the example absolute value calculator 506, the example threshold processor 508, the example moving average calculator 510, the example audio sample selector 512, the example audio signal delayer 514, the example correlation engine 516, the example offset selector 518, the example post-processor 520, the example offset analyzer 600, the example cluster analyzer 602, and/or the example weighted averager 604, and/or more generally the example audience measurement system is/are hereby expressly defined to include a tangible computer readable storage device or storage disk such as a memory, a digital versatile disk (DVD), a compact disk (CD), a Blu-ray disk, etc. storing the software and/or firmware. Further still, the example audience measurement system of FIG. 1 may include one or more elements, processes and/or devices in addition to, or instead of, those illustrated in FIGS. 1-7, and/or may include more than one of any or all of the illustrated elements, processes and devices.

Flowcharts representative of example machine readable instructions for implementing the example meter 112 of FIGS. 1-3, the example direction detector 300 of FIGS. 3 and 5, and the example post-processor 520 of FIGS. 5 and 6 are shown in FIGS. 9-12. In these examples, the machine readable instructions comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 9-12, many other methods of implementing the example meter 112 of FIGS. 1-3, the example direction detector 300 of FIGS. 3 and 5, and the example post-processor 520 of FIGS. 5 and 6 may alternatively be used. For example, the order of execution of the blocks may be changed, and/or some of the blocks described may be changed, eliminated, or combined.

As mentioned above, the example processes of FIGS. 9-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 9:
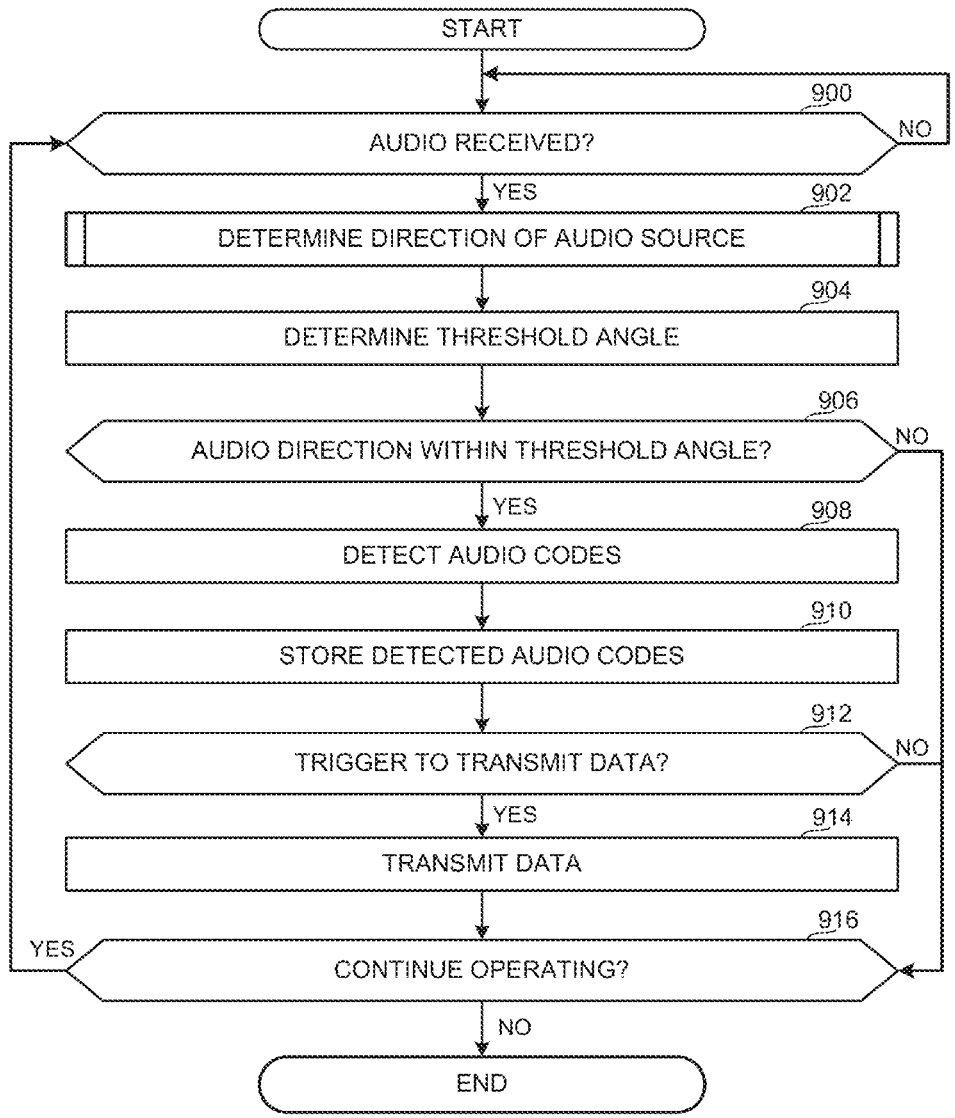
FIGS. 9-10 are flowcharts representative of example machine readable instructions that may be executed to implement the example meter of FIGS. 1-3.

FIG. 9 is a flowchart representative of example machine readable instructions for implementing the example meter 112 of FIGS. 1-3. FIG. 9 begins when the example meter 112 determines whether an audio signal has been received by the first microphone 114 and the second microphone 116 (block 900). If the example meter 112 determines that audio has not been received (block 900), then the example meter 112 waits until audio has been received. If the example meter 112 determines that audio has been received (block 900), then the example direction detector 300 determines the origin direction (e.g., the angle) from which the audio signal was received (block 902). An example method of implementing block 902 of FIG. 9 is discussed further in connection with FIG. 11.

After the example direction detector 300 determines the origin direction from which the audio signal was received (block 902), the example filter 302 determines a threshold angle (e.g., an angle with respect to the example meter 112 that the example media device 108 is located) by accessing the example media device database (block 904). The example filter 302 then determines whether the origin direction determined by the example direction detector 300 is within the threshold angle (block 906).

If the example direction detector 300 determines that the origin direction determined by the example direction detector 300 is not within the threshold angle (block 906), then control passes to block 916. If the example direction detector 300 determines that the origin direction determined by the example direction detector 300 is within the threshold angle (block 906), then the example code reader 306 detects audio codes embedded in the audio signal received by the example first microphone 114 and the second microphone 116 using known techniques (block 908). The example code reader 306 then stores the detected audio codes in the example memory 308 (block 910).

The example meter 112 then determines whether to transmit data to the example data collection facility 130 (block 912). This determination may be based on the time of day (e.g., data is transmitted every day at 12:00 A.M.), the time since the last data transmission (e.g., data is transmitted every hour), the amount of data in the example memory 308 (e.g., data is transmitted when the example memory 308 is full), or other factors. If the example meter 112 determines that data is to be transmitted (block 912), then the example data transmitter 310 transmits the data in the example memory 308 to the example data collection facility 130 (block 914). If the example meter 112 determines that data is not to be transmitted (block 912), then control passes to block 916.

After the example data transmitter 310 transmits the data in the example memory 308 to the example data collection facility 130 (block 914), or after the example meter 112 determines that data is not to be transmitted (block 912), or after the example filter 302 determines that the origin direction detected by the example direction detector 300 is not within the threshold angle (block 906), the example meter 112 determines whether to continue operating (block 916). This determination may be made based on whether the example media device 108 is powered off or other factors. If the example meter 112 determines to continue operating (block 916), then control returns to block 900. If the example meter 112 determines not to continue operating (block 916), then the example of FIG. 9 ends.

Figure 10:
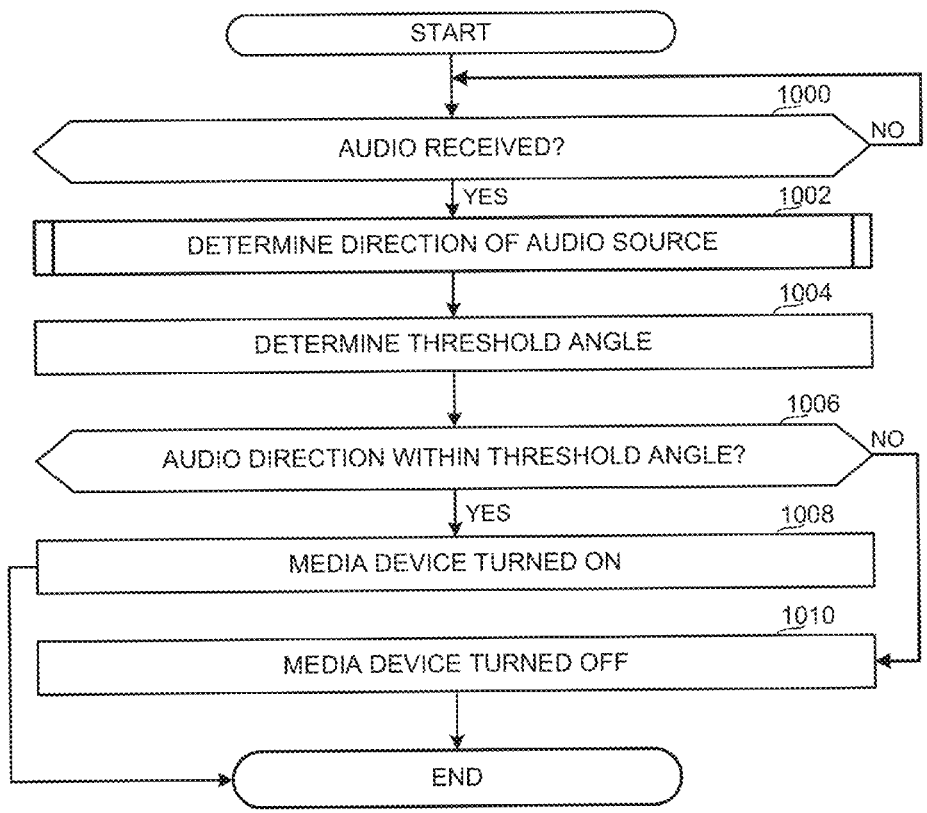

FIG. 10 is a flowchart representative of example machine readable instructions for an alternative manner of implementing the example meter 112 of FIGS. 1-3 to determine whether the example media device 108 of FIG. 1 is on or off. FIG. 10 begins when the example meter 112 determines whether an audio signal has been received by the first microphone 114 and the second microphone 116 (block 1000). If the example meter 112 determines that audio has not been received (block 1000), then the example meter 112 waits until audio has been received. If the example meter 112 determines that audio has been received (block 1000), then the example direction detector 300 determines the origin direction (e.g., the angle) from which the audio signal was received (block 1002). An example method of implementing block 1002 of FIG. 10 is discussed further in connection with FIG. 11.

After the example direction detector 300 determines the origin direction from which the audio signal was received (block 1002), the example filter 302 determines a threshold angle (e.g., an angle with respect to the example meter 112 that the example media device 108 is located) by accessing the example media device database (block 1004). The example filter 302 then determines whether the origin direction determined by the example direction detector 300 is within the threshold angle (block 1006).

If the example direction detector 300 determines that the origin direction determined by the example direction detector 300 is within the threshold angle (block 1006), then the example direction detector 300 determines that the media device 108 is turned on (block 1008). If the example direction detector 300 determines that the origin direction determined by the example direction detector 300 is not within the threshold angle (block 1006), then the example direction detector 300 determines that the media device 108 is turned off (block 1010). After the example direction detector 300 determines that the media device 108 is turned on (block 1008) or after the direction detector 300 determines that the media device 108 is turned off (block 1010), the example of FIG. 10 ends.

Figure 11:
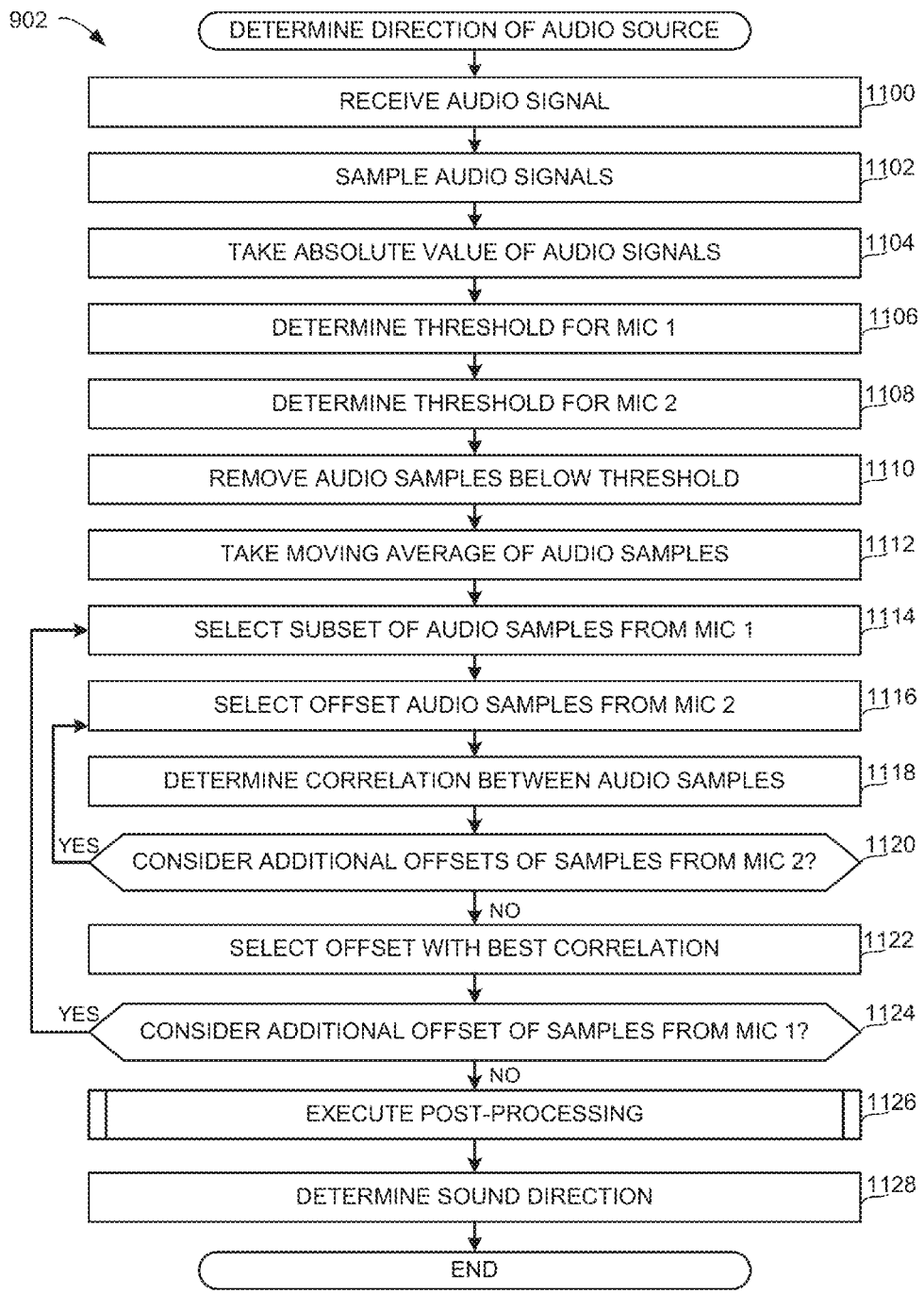
FIG. 11 is a flowchart representative of example machine readable instructions that may be executed to implement the example direction detector of FIGS. 3 and 4.

FIG. 11 is a flowchart representative of example machine readable instructions for implementing the example direction detector 300 of FIGS. 3 and 4. FIG. 11 begins when the example first microphone receiver 500 receives an audio signal detected by the first microphone 114 (a first audio signal) and the second microphone receiver 502 receives an audio signal detected by the second microphone 116 (a second audio signal) (block 1100). The example audio sampler 504 then samples the first and second audio signals to convert the received audio signals from analog to digital audio signals (block 1102). The example absolute value calculator 506 then determines the absolute value of the first and second audio signals (block 1104).

The example threshold processor 508 then determines a decimation threshold for the first audio signal received by the first microphone receiver 500 (block 1106). In the illustrated example, the threshold processor 508 determines a decimation threshold audio intensity such that, for example, 98.5% of the audio samples in the first audio signal fall below the decimation threshold. The example threshold processor 508 then determines a decimation threshold for the second audio signal received by the second microphone receiver 502 (block 1108). In the illustrated example, the threshold processor 508 determines a decimation threshold audio intensity such that, for example, 98.5% of the audio samples in the second audio signal fall below the decimation threshold. The example threshold processor 508 then removes the audio samples from the first and second audio signals that have an intensity below the respective determined decimation thresholds (block 1110). The example moving average calculator 510 then determines a moving average of the first and second audio signals (block 1112). In the illustrated example, the moving average calculator 510 determines a moving average over the first and second audio signals using a sample size of two to determine the moving average.

The example audio sample selector 512 then selects a subset of the samples from the first audio signal (block 1114). In the illustrated example, the audio sample selector 512 selects, for example, 1,000 samples from the first audio signal at 1,000 points in time, equally spaced over a segment of the first audio signal (e.g., over the first 36 seconds of the received audio signal). The example audio signal delayer 514 then selects an equal number of samples from the second audio signal at the same points in time but delayed by a certain number of samples (block 1116). In the illustrated example of FIG. 11, the audio signal delayer 514 selects 1,000 samples from the second audio signal at the same points in time as the 1,000 samples from the first audio signal but delayed by some amount of samples. In the illustrated example, as shown in FIG. 8A where the distance between the first and second microphones 114, 116 is three inches, depending on the location of the a sound source, the delay between an audio signal arriving at the first microphone 114 and the second microphone 116 can be up to eleven samples. As such, in the illustrated example, the audio samples from the second audio signal selected by the audio signal delayer 514 are delayed by between −11 and 11 samples compared to the sample selected by the audio sample selector 512 from the first audio signal.

After the example audio sample selector 512 selects a set of samples from the first audio signal and the example audio signal delayer 514 selects a set of samples from the second audio signal, the example correlation engine 516 determines a correlation between the two set of audio samples (block 1118). The example correlation engine 516 may employ any type of statistical and/or correlation algorithm on received audio signals such as, but not limited to a normalized correlation, Pearson correlation coefficients and/or rank correlation coefficients.

After the example correlation engine 516 determines a correlation between the two sets of audio samples (block 1118), the example offset selector 518 determines whether additional correlations are needed between the first audio signal and the second audio signal offset by a different number of samples. In the illustrated example, as explained above, a correlation is taken between the samples from the first audio signal and each of the sets samples from the second audio signal offset by a different number of samples from −11 to 11 (i.e., 23 different sets of samples from the second audio signal). In the illustrated example, in block 1118, the offset selector 518 determines whether the correlation engine 516 has determined a correlation between the set of samples from the first audio signal and all 23 sets of samples from the second audio signal. If the example offset selector 518 determines that additional offsets of the second audio signal need to be processed by the example correlation engine 516 (block 1120), then control returns to block 1116 and an additional set of samples from the second audio signal with an offset of a different number of samples is selected by the audio signal delayer 514. If the example offset selector 518 determines that no additional offsets of the second audio signal need to be processed by the example correlation engine 516 (block 1120), then control passes to block 1122.

In block 1122, the example offset selector selects the offset number of samples (e.g., an offset of between −11 and 11 samples) that yielded the highest correlation value with the samples from the first audio signal. The example offset selector stores this offset value. The example audio sample selector 512 determines whether additional offsets of the first audio signal need to be considered (block 1124), as discussed below.

In block 1122, the example offset selector 512 selected the offset amount of samples for the second audio signal that best correlated to the samples from the first audio signal. However, this correlation only considered a portion of the total samples from the first audio signal. For example, if a 36-second audio segment is sampled at 48,000 samples per second, the audio segment would have 1,728,000 but the correlation may have only considered 1,000 of these samples. Therefore, better results may be obtained considering a different set of samples from the first audio signal (e.g., a different 1,000 samples).

In the illustrated example, twenty such sets of 1,000 samples from the first audio signal are considered and each of these twenty sets of samples are correlated against 23 sets of samples from the second audio signal (i.e., offset by between −11 and 11 samples). The best offset value out of these 23 sets of samples from the second audio signal (e.g., the offset that best correlates to the set of samples from the first audio signal) is chosen for each of the twenty sets of samples from the first audio signal and the twenty offsets are combined to determine the best overall offset.

In order to achieve the best results, the audio sample selector 512 selects the twenty different sets of samples from the first audio signal so that there is the smallest possible overlap between the samples contained in each of the twenty sets of samples. In the illustrated example, each of the sets 1,000 of samples from the first audio signal are offset by 0.5001 seconds from each other. The value of 0.5001 is chosen in the illustrated example because offsetting the sets of 1,000 samples by this amount of time yields a relatively small amount of overlap between the samples of the sets of samples. In other examples, where for example, a different number of samples is chosen in each set of samples or a different sampling rate is used, a different offset time value may be selected.

Returning to FIG. 11, if the example audio sample selector 512 determines that additional sets of samples from the first audio signal are to be considered (block 1124), then control returns to block 1114 and the example audio sample selector 512 selects an additional set of samples from the first audio signal offset by some amount (e.g., 0.5001 seconds) from the previously selected set of samples. If the example audio sample selector 512 determines that additional sets of samples from the first audio signal are not to be considered (block 1124), then each of the offsets selected by the example offset selector 518 (e.g., each of 20 offset values) are processed by the example post-processor 520 (block 1126). An example method of implementing block 1126 is discussed further in connection with FIG. 12. After the example post-processor 520 determines an overall sample offset between the first audio signal and the second audio signal (block 1126), the example direction detector 300 determines an origin direction for the source of the received audio signals by, for example, looking at a table such as table 800 of FIG. 8A or using an algorithm (block 1128). The example of FIG. 11 then ends.

Figure 12:
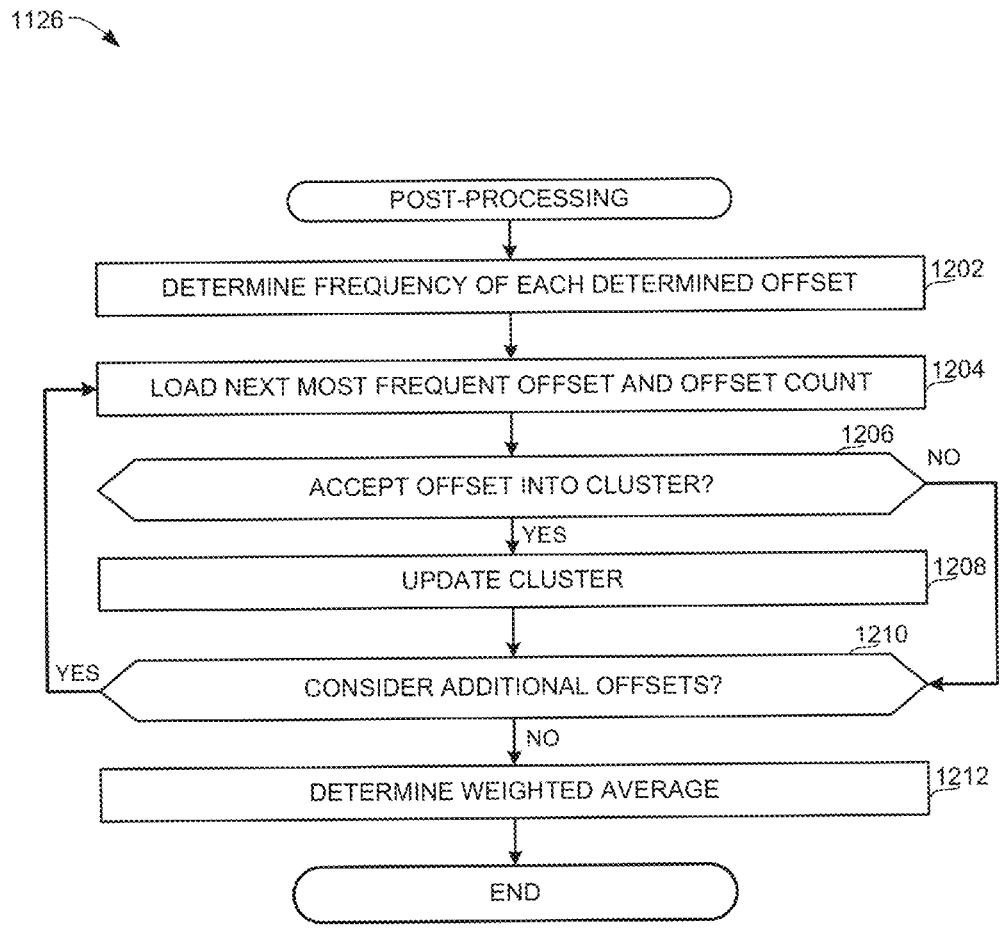
FIG. 12 is a flowchart representative of example machine readable instructions that may be executed to implement the example post-processor of FIGS. 5 and 6.

FIG. 12 is a flowchart representative of example machine readable instructions for implementing the example post-processor 520 of FIGS. 4 and 5. FIG. 12 begins when the example offset analyzer 600 determines the frequency of each of the sample offsets output by the example offset selector 518 of FIG. 5 (block 1202). An example of such a determination is illustrated in FIG. 13.

FIG. 13 illustrates example table 1300 containing sample data output by the example offset selector 518 of FIG. 5. Column 1304 of table 1300 lists sample offset values output by the example offset selector 518. Column 1302 of table 1300 lists the number of times that each of the offsets was output by the example offset selector 518. In the example of table 1300, an offset of −12 samples was selected three times by the example offset selector 518 and an offset of −13 samples was selected two times by the example offset selector 518.

Returning to FIG. 12, after the example offset analyzer 600 determines the frequency of each offset output by the example offset selector 518 (block 1202), the example cluster analyzer 602 loads the most frequent offset (e.g., the offset value that was selected by the example offset selector 518 the most number of times). In the example of FIG. 13, the most frequent offset was −12 samples, which was selected by the example offset selector three times. The example cluster analyzer 602 then determines whether to accept the offset into the cluster (block 1206). The first time that an offset is considered by the example cluster analyzer 602 the cluster analyzer 602 accepts the offset into the cluster. Subsequent offset values considered by the example cluster analyzer 602 are accepted into the cluster if the offset value being considered is within two samples of one of the other offset values in the cluster. In the example table 1300 of FIG. 13, the offset value of −12 samples would be accepted into the cluster analyzer as it would be the first value considered. In the example table 1300 of FIG. 13, the offset value of −13 samples would be considered next and would be accepted into the cluster because −13 is within two of −12. In the example table 1300 of FIG. 13, the offset value of 20 would be considered next and would not be accepted into the cluster because 20 is not within two of −13 or −12.

Returning to FIG. 12, if the example cluster analyzer 602 determines that the offset value being considered is not accepted into the cluster (block 1206), then control passes to block 1210. If the example cluster analyzer 602 determines that the offset value being considered is accepted into the cluster (block 1206), then the cluster is updated with the new offset value and offset count (e.g., an offset value of −12 and an offset count of 3, in the example table 1300 of FIG. 13) (block 1208).

The example cluster analyzer 602 then determines whether additional offsets are to be considered (block 1210). In the illustrated example, the cluster analyzer 602 determines the three most frequent offset values output by the example offset selector 518. In other examples, a different number of the most frequent offset values may be considered. In the illustrated example, if more than three offsets are selected for the three most frequent times (e.g., there is a tie as in table 1300 of FIG. 13 wherein −13 samples, 20 samples, −6 samples, and −14 samples were all selected by the example offset selector 518 twice), then the cluster analyzer 602 randomly selects the offset values to use to break the tie (e.g., in the example table 1300 of FIG. 13, offset values of −13 samples and 20 samples are selected along with −12 samples). In other examples, additional offset values (e.g., more than three) may be selected when there is a tie among the most frequently selected offset values.

If the example cluster analyzer 602 determines that additional offsets are to be considered (block 1210), then control returns to block 1204. If the example cluster analyzer 602 determines that additional offsets are not to be considered (block 1210), then the example weighted averager 604 takes a weighted averager of the offset values in the cluster, weighted by the offset counts. In the example table 1300 of FIG. 13, as discussed above the offsets of −12 samples with an offset count of 3 and −13 samples with an offset count of 2 are accepted into the cluster. Therefore, in the example table 1300 of FIG. 13, the example weighted averager 604 would calculate a weighted average as $((3*-12)+(2*-13))/(3+2)$ which yields a value of −12.4 samples. The example of FIG. 12 then ends.

Example methods, apparatus, systems and/or articles of manufacture disclosed herein allow for the determination of the origin direction of an audio source using a relatively small number of samples of an audio signal emitted by the audio source. For example, the audience measurement system of the illustrated example may determine the origin direction of a 36-second audio segment from an audio source sampled at 48,000 samples per second, resulting in 1,728,000 samples. The audience measurement system of the illustrated example determines the origin direction of the audio source by calculating correlations between 20 sets of audio samples detected by two microphones, in which each set contains 1,000 audio samples. This results in greatly increased efficiency, reduced processing time and/or fewer required resources than a measurement system that calculated a correlation between audio signals received by two microphones using all 1,728,000 samples.

Figure 14:
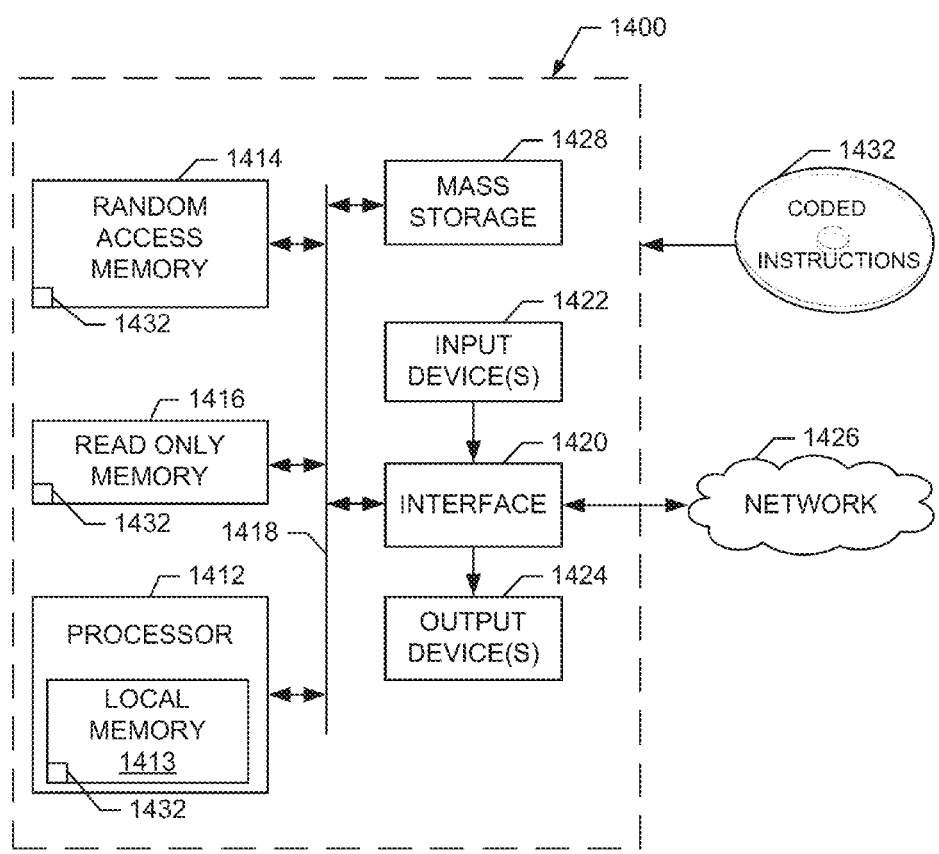
FIG. 14 is a block diagram of an example processing system capable of executing the example machine readable instructions of FIGS. 9-11 and/or 12 to implement the example meter 112 of FIGS. 1-3, the example direction detector 300 of FIGS. 3 and 5, and/or the example post-processor 520 of FIGS. 5 and 6.

FIG. 14 is a block diagram of an example processor platform 1400 capable of executing the instructions of FIGS. 9-12 to implement the example meter 112, the example of FIGS. 1 and 3, the example direction detector 300 of FIGS. 3 and 5, and the example post-processor 520 of FIGS. 5 and 6. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 9-12 may be stored in the mass storage device 1428, in the volatile memory 1414, in the non-volatile memory 1416, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to distinguish local media from spillover media content comprising:
    sampling a first audio signal from a first source received by a first microphone;
    sampling a second audio signal received by a second microphone from the first source, wherein the second microphone is separated from the first microphone by a first distance;
    calculating, with a processor, an origin direction of the first source based on a time difference between receipt of the first and second sampled audio signals;
    determining, with the processor, whether the origin direction is within a threshold angle;
    when the origin direction is within the threshold angle, retaining the media associated with the first source; and
    when the origin direction exceeds the threshold angle, ignoring the media associated with the first source.

2. A method as defined in claim 1, further including:
    calculating a first absolute value audio signal corresponding to an absolute value of the first sampled audio signal;
    calculating a second absolute value audio signal corresponding to an absolute value of the second sampled audio signal; and
    applying a first and second decimation threshold to the first and second absolute value audio signals, respectively.

3. A method as defined in claim 2, further including:
    removing samples from the first absolute value audio signal with intensities below the first decimation threshold; and
    removing samples from the second absolute value audio signal with intensities below the second decimation threshold.

4. A method as defined in claim 3, wherein the first and second decimation thresholds are determined such that removing samples from the first and second absolute value audio signals removes a majority of the samples from the first and second absolute value audio signals.

5. A method as defined in claim 1, further including:
    selecting a first set of samples from the first sampled audio signal;
    selecting a second set of samples from the second sampled audio signal; and
    determining a first correlation value between the first set of samples and the second set of samples.

6. A method as defined in claim 5, further including calculating a moving average of the first and second sampled audio signals, wherein each point of the moving average of the first and second sampled audio signals includes an average of two samples from the first and second audio signals, respectively.

7. A method as defined in claim 5, wherein the first set of samples includes samples from the first sampled audio signal that are equally spaced between a first point in time and a second point in time.

8. A method as defined in claim 7, wherein the second set of samples includes samples from the second sampled audio signal that are equally spaced between the first point in time and the second point in time.

9. A method as defined in claim 8, further including:
    selecting a third set of samples from the second sampled audio signal, wherein the third set of samples is offset from the second set of samples by a first number of samples; and
    determining a second correlation value between the first set of samples and the third set of samples.

10. A method as defined in claim 9, wherein the time difference is determined by determining the greater of the first correlation value and the second correlation value.

11. A method as defined in claim 7, further including selecting a fourth set of samples from the first sampled audio signal, wherein the fourth set of samples is offset from the first set of samples by a first time.

12. A method as defined in claim 1, wherein the first source is a media device.

13. A method as defined in claim 1, wherein the threshold angle is based on the physical location of the first source associated with the media.

14. A tangible machine readable storage medium comprising instructions that, when executed, cause a machine to at least:
    sample a first audio signal from a first source received by a first microphone;

sample a second audio signal received by a second microphone from the first source, wherein the second microphone is separated from the first microphone by a first distance;

calculate an origin direction of the first source based on a time difference between receipt of the first and second sampled audio signals;

determine whether the origin direction is within a threshold angle;

when the origin direction is within the threshold angle, retain media associated with the first source; and when the origin direction exceeds the threshold angle, ignore the media associated with the first source.

15. A machine readable storage medium as defined in claim 14, wherein the first source is a media device.

16. A machine readable storage medium as defined in claim 14, wherein the threshold angle is based on the physical location of the first source associated with the media.

17. A machine readable storage medium as defined in claim 14, wherein the instructions cause the machine to:

calculate a first absolute value audio signal corresponding to an absolute value of the first sampled audio signal;

calculate a second absolute value audio signal corresponding to an absolute value of the second sampled audio signal; and apply first and second decimation thresholds to the first and second absolute value audio signals, respectively.

18. A machine readable storage medium as defined in claim 17, wherein the instructions cause the machine to:

remove samples from the first absolute value audio signal with intensities below the first decimation threshold; and remove samples from the second absolute value audio signal with intensities below the second decimation threshold.

19. A machine readable storage medium as defined in claim 18, wherein the machine determines the first and second decimation thresholds such that removing samples from the first and second absolute value audio signals removes a majority of the samples from the first and second absolute value audio signals.

20. A machine readable storage medium as defined in claim 14, wherein the instructions cause the machine to:

select a first set of samples from the first sampled audio signal;

select a second set of samples from the second sampled audio signal; and determine a first correlation value between the first set of samples and the second set of samples.

21. A machine readable storage medium as defined in claim 20, wherein points of the moving average of the first and second sampled audio signals correspond to an average of two samples from the first and second sampled audio signals, respectively.

22. A machine readable storage medium as defined in claim 20, wherein the first set of samples includes samples from the first sampled audio signal that are equally spaced between a first point in time and a second point in time.

23. A machine readable storage medium as defined in claim 22, wherein the second set of samples includes samples from the second sampled audio signal that are equally spaced between the first point in time and the second point in time.

24. A machine readable storage medium as defined in claim 23, wherein the instructions cause the machine to:

select a third set of samples from the second sampled audio signal, wherein the third set of samples is offset from the second set of samples by a first number of samples; and determine a second correlation value between the first set of samples and the third set of samples.

25. A machine readable storage medium as defined in claim 24, wherein the machine determines the time difference by determining the greater of the first correlation value and the second correlation value.

26. A machine readable storage medium as defined in claim 22, wherein the instructions cause the machine to select a fourth set of samples from the first sampled audio signal, wherein the fourth set of samples is offset from the first set of samples by a first time.

27. An apparatus to distinguish local media from spillover media comprising:

an audio sampler to sample a first audio signal from a first source received by a first microphone and sample a second audio signal received by a second microphone from the first source, wherein the second microphone is separated from the first microphone by a first distance;

a direction detector to calculate an origin direction of the first source based on a time difference between receipt of the first and second sampled audio signals; and a filter to determine whether the origin direction is within a threshold angle, the filter to retain the media associated with the first source when the origin direction is within the threshold angle, the filter to ignore the media associated with the first source when the origin direction exceeds the threshold angle, at least one of the audio sampler, the direction detector, or the filter being implemented by hardware.

28. An apparatus as defined in claim 27, wherein the first source is a media device.

29. An apparatus as defined in claim 27, wherein the threshold angle is based on the physical location of the first source associated with the media.

30. An apparatus as defined in claim 27, further including:

an absolute value calculator to calculate a first absolute value of the first sampled audio signal, the absolute value calculator to calculate a second absolute value of the second sampled audio signal; and a threshold processor to apply a first and second decimation threshold to the first and second absolute value audio signals, respectively.

31. An apparatus as defined in claim 30, wherein the threshold processor is to remove samples from the first sampled audio signal with intensities below the first decimation threshold, and remove samples from the second sampled audio signal with intensities below the second decimation threshold.

32. An apparatus as defined in claim 31, wherein threshold processor removes a majority of the samples from the first and second sampled audio signals based on the first and second decimation thresholds.

33. An apparatus as defined in claim 27, further including:

an audio sample selector to select a first set of samples from the first sampled audio signal;

an audio signal delayer to select a second set of samples from the second sampled audio signal; and a correlation engine to determine a first correlation value between the first set of samples and the second set of samples.

34. An apparatus as defined in claim 33, further including a moving average calculator to calculate a moving average of the first and second audio signals, wherein the moving average calculator is to calculate the moving average of the first and second audio signals such that points of the moving averages include an average of two samples from the first and second sampled audio signals, respectively.

35. An apparatus as defined in claim 33, wherein the audio sample selector is to select samples from the first sampled audio signal that are equally spaced between a first point in time and a second point in time.

36. An apparatus as defined in claim 35, wherein the audio signal delayer is to select samples from the second sampled audio signal that are equally spaced between the first point in time and the second point in time.

37. An apparatus as defined in claim 36, wherein the audio signal delayer is to select a third set of samples from the second sampled audio signal offset from the second set of samples by a first number of samples, and the correlation engine is to determine a second correlation value between the first set of samples and the third set of samples.

38. An apparatus as defined in claim 36, further including an offset selector to determine the time difference by determining the greater of the first correlation value and the second correlation value.

39. An apparatus as defined in claim 35, wherein the audio sample selector is to select a fourth set of samples from the first sampled audio signal offset from the first set of samples by a first time.

\* \* \* \* \*